(12) United States Patent  
Eto et al.

(10) Patent No.: US 11,575,284 B2  
(45) Date of Patent: Feb. 7, 2023

(54) LAMINATED CORE WITH WELDING MARK, ROTARY ELECTRIC MACHINE HAVING THE SAME, AND METHOD FOR MANUFACTURING LAMINATED CORE WITH WELDING MARK

(71) Applicant: DENSO CORPORATION, Kariya (JP)

(72) Inventors: Jun Eto, Kariya (JP); Kazuki Yamauchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 155 days.

(21) Appl. No.: 16/809,139

(22) Filed: Mar. 4, 2020

(65) Prior Publication Data

US 2020/0321813 A1 Oct. 8, 2020

(30) Foreign Application Priority Data

Apr. 8, 2019 (JP) .............................. JP2019-073593

(51) Int. Cl.

| | |
|---|---|
| *H02K 1/16* | (2006.01) |
| *H02K 1/276* | (2022.01) |
| *B23K 26/24* | (2014.01) |
| *H02K 15/03* | (2006.01) |
| *H02K 15/02* | (2006.01) |

(52) U.S. Cl.  
CPC .............. *H02K 1/16* (2013.01); *B23K 26/24* (2013.01); *H02K 1/276* (2013.01); *H02K 15/024* (2013.01); *H02K 15/03* (2013.01)

(58) Field of Classification Search  
CPC .... B23K 26/0622; B23K 26/24; H02K 15/02; H02K 15/024; H02K 15/03; H02K 1/16  
See application file for complete search history.

(56) References Cited

U.S. PATENT DOCUMENTS

| | | |
|---|---|---|
| 5,171,962 A | 12/1992 | Sakanishi |
| 6,249,072 B1 | 6/2001 | Sakagami et al. |
| 6,262,511 B1 | 7/2001 | Ohashi et al. |
| 6,477,761 B1 | 11/2002 | Ohashi et al. |
| 7,138,742 B2 * | 11/2006 | Arimitsu .................. B60L 50/16 310/216.057 |
| 11,271,459 B2 * | 3/2022 | Ushida ................... H02K 15/03 |

(Continued)

FOREIGN PATENT DOCUMENTS

| | | |
|---|---|---|
| JP | H09-149605 A | 6/1997 |
| JP | H11-69733 A | 3/1999 |

(Continued)

*Primary Examiner* — Minh N Trinh  
(74) *Attorney, Agent, or Firm* — Oliff PLC (57) ABSTRACT

A laminated core has a plurality of steel plates that are laminated in a thickness direction. The laminated core has a line shaped welding mark connecting a plurality of steel plates. The welding mark extends over the plurality of steel plates at the end face where the plurality of steel plates are exposed. The welding mark has a welding depth which fluctuates with a wavelength that is longer than the thickness of the steel sheet. The welding mark has a continuous portion in which the welding depth extends over a plurality of steel plates without fluctuation. Furthermore, the welding mark has a fluctuation portion in which the welding depth periodically fluctuates over a plurality of steel plates. The depth in the continuous portion is substantially equal to the depth in the fluctuation portion.

8 Claims, 6 Drawing Sheets

(56) References Cited

U.S. PATENT DOCUMENTS

2001/0015589 A1    8/2001  Sakagami et al.
2019/0052155 A1    2/2019  Ushida et al.
2020/0321813 A1* 10/2020  Eto ........................ H02K 1/276

FOREIGN PATENT DOCUMENTS

| JP | H11-290965 A | 10/1999 |
| --- | --- | --- |
| JP | 2002-35969 A | 2/2002 |
| JP | 3546579 B2 | 7/2004 |
| JP | 2004-350351 A | 12/2004 |
| JP | 5457753 B2 | 4/2014 |

\* cited by examiner

LAMINATED CORE WITH WELDING MARK, ROTARY ELECTRIC MACHINE HAVING THE SAME, AND METHOD FOR MANUFACTURING LAMINATED CORE WITH WELDING MARK

CROSS REFERENCE TO RELATED APPLICATION

The present application is based on and claims the benefit of priority of Japanese Patent Application No. 2019-073593, filed on Apr. 8, 2019, the disclosure of which is incorporated herein by reference.

TECHNICAL FIELD

The disclosure in this specification relates to a laminated core, a rotary electric machine, and a method for manufacturing a laminated core.

BACKGROUND

A plurality of steel plates are connected in a laminated core.

SUMMARY

Poor connection of a plurality of steel plates may occur due to various factors such as poor welding and cracks in a welding mark after welding. In the above-mentioned viewpoints or other viewpoints not mentioned, further improvements are required for a laminated core, a rotary electric machine, and a method for manufacturing a laminated core.

In one aspect, a laminated core disclosed herein comprises: a plurality of steel plates laminated in a thickness direction; and a line shaped welding mark connecting a plurality of the steel plates, extending over the plurality of the steel plates at an end surface where the plurality of the steel plates are exposed, and having a welding depth which fluctuates at a wavelength longer than the thickness of the steel plates.

According to the disclosed laminated core, a line shaped welding mark connects a plurality of steel plates. This welding mark has a fluctuating welding depth. Moreover, the welding depth fluctuates at a wavelength longer than the thickness of the steel plate. The fluctuating welding depth relieves stress concentration at a facing portion between the steel plates and suppresses an occurrence of cracks and a growth of cracks. As a result, a laminated core in which a plurality of steel plates are stably connected is provided.

In another aspect, a rotary electric machine disclosed herein comprises a rotor core or a stator core, which is the laminated core, wherein the welding depth of the welding mark fluctuates along the axial direction of the rotor core or the stator core.

In still another aspect, a method for manufacturing a laminated core, the method disclosed herein comprises: a laminating step of laminating a plurality of steel plates in a thickness direction; a pulse generating step of generating a plurality of pulses of welding energy by a welding device; a welding step in which the welding energy is applied to a welding position of an end surface where the plurality of steel plates are exposed, and thereby forming a welding mark having a welding depth according to the welding energy; and a moving step of moving the welding position across the plurality of steel plates on the end surface, wherein the welding step and the moving step form a line shaped welding mark having the welding depth fluctuating at a wavelength longer than the thickness of the steel plate by a plurality of the pulses on the end surface.

According to the disclosed manufacturing method of a laminated core, the welding mark having a welding depth that fluctuates at a wavelength longer than the thickness of the steel sheet is formed. The fluctuating welding depth relieves stress concentration at a facing portion between the steel plates and suppresses occurrence of cracks and growth of cracks. As a result, a method for manufacturing a laminated core in which a plurality of steel plates are stably connected is provided.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

BRIEF DESCRIPTION OF DRAWINGS

Objects, features, and advantages of the present disclosure will become more apparent from the following detailed description made with reference to the accompanying drawings, in which.

DETAILED DESCRIPTION

Several embodiments will be described with reference to the drawings. In some embodiments, parts which are functionally and/or structurally corresponding and/or associated are given the same reference numerals, or reference numerals with different hundreds digit or higher digits. For corresponding parts and/or associated parts, reference can be made to the description of other embodiments.

First Embodiment

Figure 1:
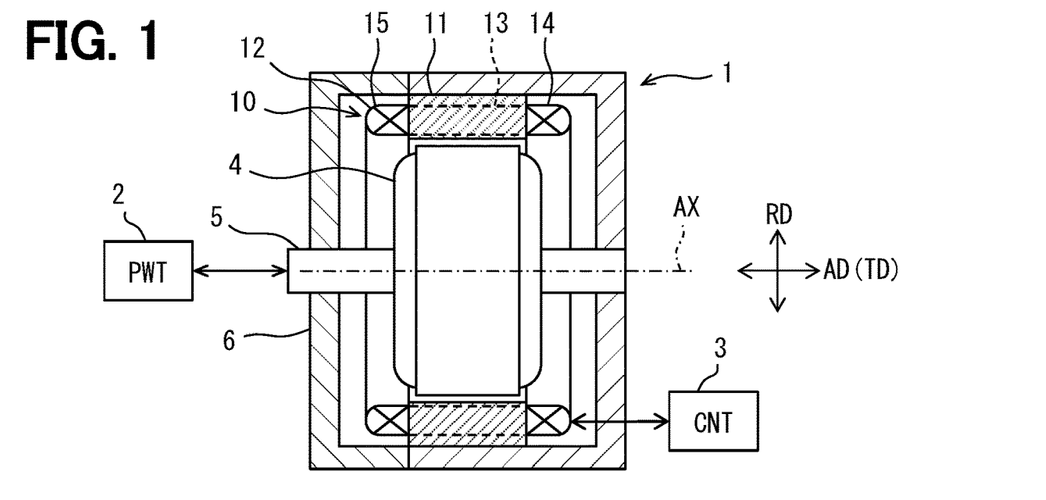
FIG. 1 is a cross-sectional view showing a rotary electric machine according to a first embodiment.

In FIG. 1, a rotary electric machine 1 is shown. The rotary electric machine 1 provides, for example, a motor generator.

The rotary electric machine 1 is operatively connected to a power system 2 (PWT) of the device. The rotary electric machine 1 can function as a generator that generates electric power using power supplied from the power system 2. The rotary electric machine 1 can function as an electric motor that supplies power to the power system 2. The rotary electric machine 1 may be a generator or an electric motor. The power system 2 may include an internal combustion engine. The power system 2 provides a main power for an apparatus. In this specification, the apparatus includes a vehicle, an air conditioner, a pumping device, and the like. Furthermore, the term vehicle includes a car, a ship, an aircraft, a simulation device, and an amusement device.

The rotary electric machine 1 is electrically connected to the control device 3 (CNT). The control device 3 includes an inverter circuit. When the rotary electric machine 1 functions as a generator, it is driven by the power system 2 and outputs electric power. The control device 3 functions as a rectifier circuit that rectifies the electric power output from the rotary electric machine 1 when the rotary electric machine 1 is used as a generator. The rotary electric machine 1 may assist the rotation of the power system 2 when functioning as an electric motor. The control device 3 supplies multiphase AC power to the rotary electric machine 1 when the rotary electric machine 1 is used as an electric motor. In this embodiment, the multiphase AC power is three-phase power.

The rotary electric machine 1 has a rotor 4 and a stator 10. The rotor 4 may rotate around an axis AX. The stator 10 is a cylindrical member having the axis AX. In the following description, the terms axial, radial, and circumferential are defined by the axis AX. The rotor 4 and the stator 10 are accommodated in a housing 6. The housing 6 fixes the stator 10 and supports the rotor 4 in a rotatable manner. The housing 6 may provide parts of the power system 2. For example, the housing 6 may provide a part of the crankcase or a part of the transmission case.

The rotor 4 is magnetically coupled to the stator 10. The rotor 4 is supported by a shaft 5 so as to be rotatable with respect to the housing 6. The shaft 5 provides a rotation axis. The rotation axis is connected to the power system 2. The rotor 4 is disposed on a radially inner side of the stator 10. The rotor 4 has a plurality of magnetic poles arranged along the circumferential direction. The plurality of magnetic poles are formed by a plurality of permanent magnets embedded in the rotor 4. The rotor 4 can be provided by various structures. The rotor 4 has, for example, 8 (N pole: 4 pieces, S pole: 4 pieces) magnetic poles.

The stator 10 has a stator core 11. The stator core 11 is a cylindrical shape. The stator core 11 is an annular shape. The stator core 11 has a plurality of steel plates laminated along the axial direction. The stator core 11 has a plurality of slots arranged in the circumferential direction. The plurality of slots are arranged at an equal pitch in the circumferential direction. The plurality of slots may be arranged at several different pitches. The plurality of slots extend in the axial direction so as to penetrate the plurality of steel plates. Further, the plurality of slots extend in the radial direction. A typical stator core 11 has an annular back core. The stator core 11 has a plurality of teeth extending radially inward from the back core. The plurality of teeth form a plurality of slots between them.

The stator 10 has a stator coil 12. The stator coil 12 is attached to the stator core 11. The stator coil 12 has accommodated conductors 13 and coil ends 14 and 15. The accommodated conductors 13 extend in straight along the axial direction. The accommodated conductors 13 are accommodated in the slot. The coil ends 14 and 15 are positioned at ends of the stator core 11. The coil ends 14 and 15 protrude from the stator core 11 in the axial direction. The coil ends 14 and 15 are bundles of a plurality of segment conductors included in the stator coil 12. In the coil ends 14 and 15, one segment conductor connects the accommodated conductor 13 located in one slot to the accommodated conductor 13 located in another different slot. The coil ends 14 and 15 may be provided by continuous turn portions of the segment conductor. The coil ends 14 and 15 may be provided by joint portions joining different segment conductors.

One coil can be provided by a continuous wire or by joining multiple segments. In this embodiment, a single coil is provided by a plurality of joined segments. Note that the plurality of segments can be joined by various joining techniques. As a joining method, for example, TIG welding, electric resistance welding, solder joining, or the like can be used. In addition, one coil is a coil that can be regarded as one phase. One coil may include a plurality of coil elements having different electrical angles. For example, one coil can include a plurality of coil elements having electrical angles that differ by several degrees.

The stator coil 12 may have a connection unit. The connection unit electrically connects the stator coil 12 so as to form a multiphase connection. The connection unit connects a plurality of leader lines so as to provide a star connection or a delta connection. The connection unit includes a plurality of connection conductors. The plurality of connection conductors are connection members for the stator coil 12. The plurality of connection conductors are made of a conductive member. The connection unit has end conductors that provide three input or output ends (power ends) in the star connection. The connection unit has a neutral point conductor that provides a neutral point in the star connection. The connection conductor is also called a bus bar.

Figure 2:
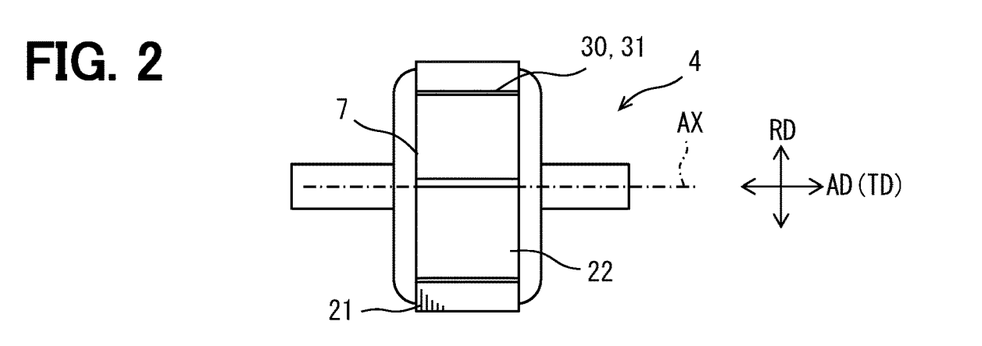
FIG. 2 is a side view showing a rotor core.

In FIG. 2, the rotor 4 has a rotor core 7. The rotor core 7 is a laminated member in which a plurality of steel plates 21 are laminated. The plurality of steel plates 21 are laminated in the thickness direction TD. The thickness direction TD is also the axial direction AD. The thickness direction TD is also called a laminating direction. The steel plate 21 can be provided by an electromagnetic steel plate. An outer peripheral surface of the rotor core is provided by an end surface 22 from which the plurality of steel plates 21 are exposed. The plurality of steel plates 21 are joined to each other and can be handled as a lamination of a magnetic core.

The plurality of steel plates 21 are connected by line shaped welding marks 30. The welding mark 30 shows a trace of a molten pool in the welding process. The welding mark 30 is also called a molten mark. The plurality of steel plates 21 are partially welded at the plurality of welding marks 30. The welding mark 30 extends across the plurality of steel plates 21 at the end surface 22. The welding mark 30 is formed by solidifying again after the plurality of steel plates 21 are partially melted by welding energy. The welding mark 30 extends continuously over the plurality of steel plates 21.

Figure 3:
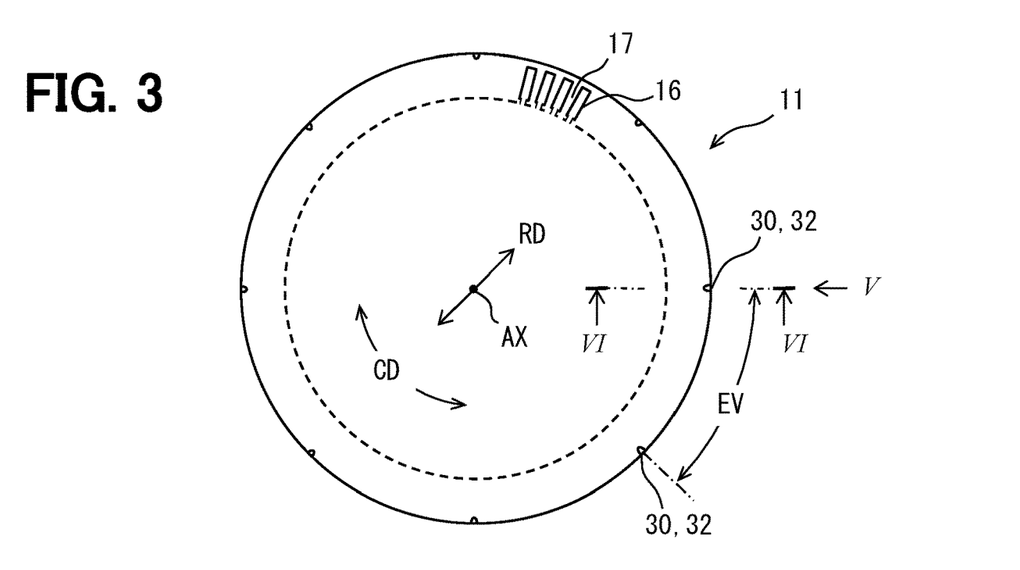
FIG. 3 is a plan view showing the stator core.

In FIG. 3, the stator 10 has a stator core 11. The stator core 11 is a laminated member in which a plurality of steel plates 21 are laminated. The plurality of steel plates 21 are laminated in the thickness direction TD. The thickness direction TD is also the axial direction AD. The steel plate 21 can be provided by an electromagnetic steel plate. An outer peripheral surface of the stator core 11 is provided by an end surface 22 from which the plurality of steel plates 21 are exposed. The plurality of steel plates 21 are joined to each other and can be handled as a lamination of a magnetic core. The plurality of steel plates 21 are partially welded at the plurality of welding marks 30. The welding mark 30 extends across the plurality of steel plates 21 at the end surface 22. The welding mark 30 is formed by solidifying again after the plurality of steel plates 21 are partially melted by welding energy. The welding mark 30 extends continuously over the plurality of steel plates 21.

The stator core 11 includes a plurality of welding marks 30. The plurality of welding marks 30 are similar to each other. The plurality of welding marks 30 are arranged at equal intervals with respect to the circumferential direction CD of the stator core 11. The interval of the plurality of welding marks 30 is 360×⅛ (degrees).

Figure 4:
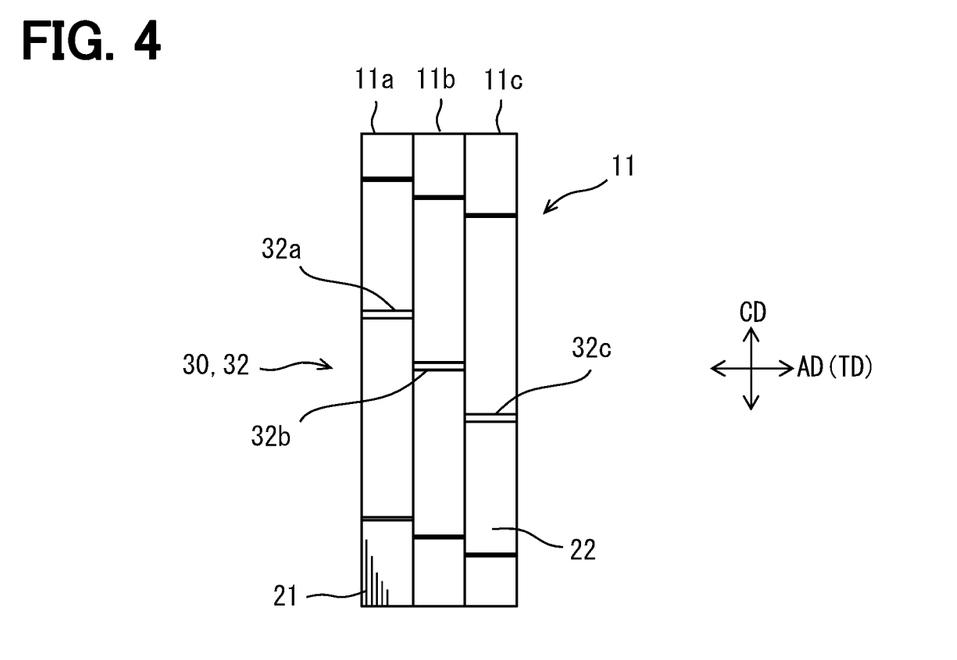
FIG. 4 is a side view showing the stator core.

In FIG. 4, the stator core 11 has a plurality of partial cores 11*a*, 11*b*, and 11*c*. The plurality of partial cores 11*a*, 11*b*, and 11*c* are laminated in the thickness direction TD. In this embodiment, the stator core 11 is provided by a laminated core in which a plurality of partial cores 11*a*, 11*b*, and 11*c* are arranged in a laminated manner.

In the following description, the laminated core 20 may refer to the rotor core 7, the stator core 11, or both the rotor core 7 and the stator core 11. The laminated core 20 may typically represent the stator core 11. The welding marks 31 of the rotor core 7 and the welding marks 32 of the stator core 11 are typically referred to as the welding marks 30.

Figure 5:
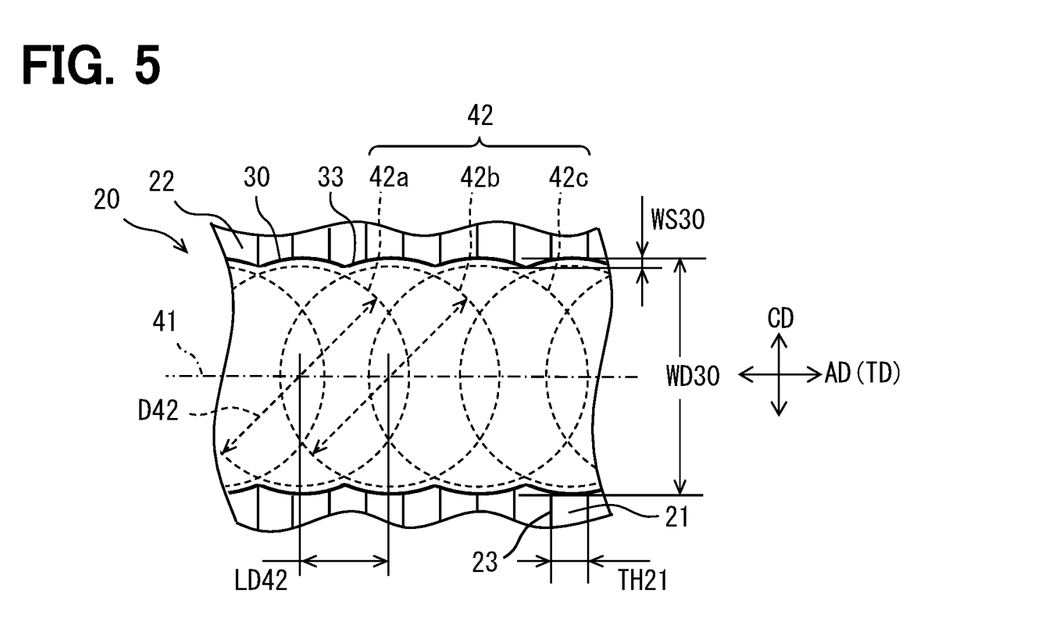
FIG. 5 is a partially enlarged view showing a welding mark.

FIG. 5 shows the welding mark 30 at the arrow V in FIG. 3. In this embodiment, a track line 41 is a straight line extending in the thickness direction TD. The track line 41 may be a curved line. The edge 33 of the welding mark 30 fluctuates in a wavy manner along the track line 41. The edge 33 corresponds to the shape of the molten pool formed during welding. The edge 33 defines the width WD30 of the welding mark 30. The welding mark 30 has a width WD30 larger than the thickness TH21 of the steel plate 21 at the end surface 22 (TH21<WD30). The welding mark 30 has a fluctuating width WD30 at the end surface 22. The width WD30 has a one-side fluctuation width WS30 smaller than the thickness TH21 of the steel plate 21 (WS30<TH21). The fluctuation width on both sides of the width WD30 of the welding mark 30 is 2×WS30. A both-side fluctuation width 2×WS30 is smaller than the thickness TH21 of the steel plate 21 (2×WS30<TH21).

In the drawing, a broken-line circle shows a laser spot 42 for laser welding on the end surface 22. The laser spot 42 has a diameter D42. The laser spot 42 may be elliptical. The welding mark 30 is also a trace of a plurality of molten pools formed intermittently by the plurality of laser spots 42. The edge 33 of the welding mark 30 is slightly smaller or slightly larger than the laser spot 42.

In the illustrated example, the edge 33 is drawn larger than the laser spot 42. In a manufacturing method described later, the plurality of laser spots 42 are irradiated with a distance LD42 apart. The distance LD42 is a distance between the centers of the plurality of laser spots 42. The distance LD42 is set so as to form the welding mark 30 extending continuously over the plurality of steel plates 21. The distance LD42 is larger than the thickness TH21 of the steel plate 21. The distance LD42 defines the wavelength LD42 of the fluctuation of the welding depth DP30 described later.

The plurality of laser spots 42 overlap each other. This overlapping trace appears on the welding mark 30 as a shape of the edge 33. The distance LD42 is larger than the thickness TH21 of the steel plate 21 and smaller than the diameter D42 of the laser spot 42 (TH21<LD42<D42). In a desirable form, the distance LD42 is larger than the thickness TH21 of the steel plate 21 and smaller than the radius D42/2 of the laser spot 42 (TH21<LD42<D42/2). As a result, at least two laser spots 42 partially overlap on the track line 41. Further, the three laser spots 42 partially overlap on the track line 41. In the example shown in the drawing, the second laser spot 42*b* irradiated next and the third laser spot 42*c* irradiated next partially overlap the first laser spot 42*a*. The overlapping amount of the two laser spots 42 can be 60±10% of the diameter D42. An overlap of the plurality of laser spots 42 defines an inclination due to a fluctuation in welding depth described later. The overlap of the plurality of laser spots 42 makes it possible to reduce an inclination angle due to the fluctuation of the welding depth even in a thin and sharp weld penetration shape by laser welding.

Figure 6:
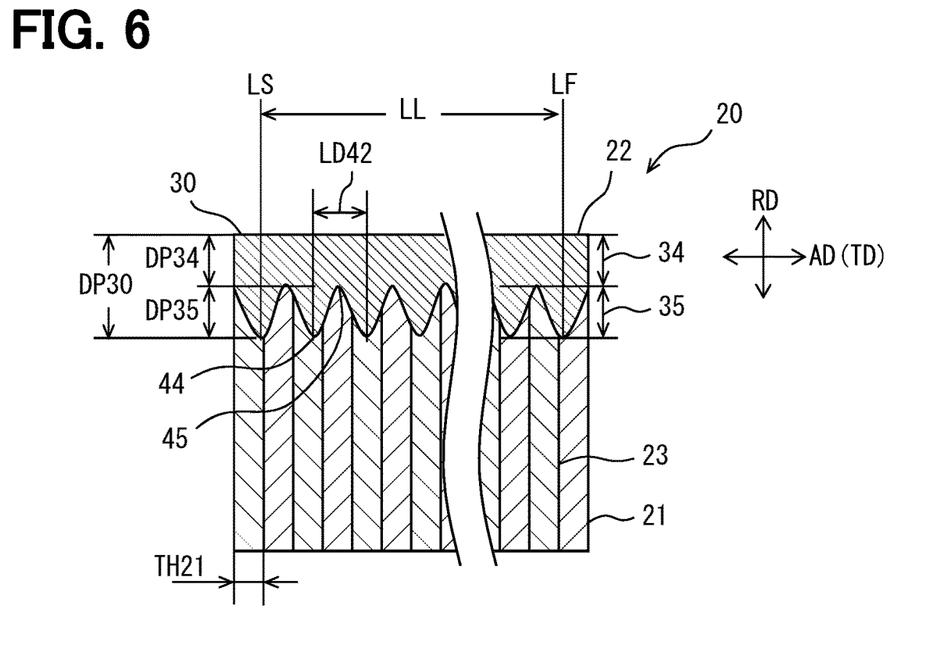
FIG. 6 is a cross-sectional view showing the welding marks.

FIG. 6 shows a cross section at a line VI-VI in FIG. 3. In the drawing, a cross section of the welding mark 30 on the track line 41 is shown. The welding mark 30 continuously extends from one end to the other end of the stator core 11 which is a laminated core. The welding mark 30 is formed by a laser welding process executed at a distance LL between an initial position LS and an end position LF. The initial position LS is the first irradiation position. The end position LF is the last irradiation position. The laser welding process includes a plurality of pulsed laser irradiations on the distance LL. The laser welding process may be started outside a range of the laminated core and terminated outside the range of the laminated core.

In the rotor core 7 as the laminated core, the welding depth DP30 of the welding mark 30 fluctuates along the axial direction AD. In the stator core 11 as the laminated core, the welding depth DP30 of the welding mark 30 fluctuates along the axial direction AD. The welding depth DP30 is also the thickness of the welding mark 30 in the radial direction RD.

The welding mark 30 has a series of welding depths DP30 continuous over the plurality of steel plates 21. The welding depth DP30 fluctuates along the thickness direction TD. The welding mark 30 has a welding depth DP30 which fluctuates with a wavelength LD42 that is longer than the thickness TH21 of the steel sheet 21. The deepest vertex 44 of the welding depth DP30 is also the vertex of the weld penetration shape generated by one laser spot 42. The shallowest vertex 45 of the welding depth DP30 is also a crossing point of the weld penetration shapes generated by two laser spots 42. The welding mark 30 has a continuous portion 34 that extends without fluctuation over the plurality of steel plates 21 and a fluctuating portion 35 that periodically fluctuates over the plurality of steel plates 21. The depth DP34 in the continuous portion 34 and the depth DP35 in the fluctuating portion 35 are substantially equal.

The plurality of steel plates 21 are in contact with each other at a facing portion 23. In other words, the plurality of steel plates 21 can be separated at the facing portion 23. The welding mark 30 has a three-dimensional curved boundary surface. The boundary surface is a boundary between the plurality of steel plates 21 and the welding mark 30. Furthermore, the fluctuating welding depth DP30 provides a curve even at the deepest part of the boundary surface. As a result, the boundary surface and the facing portion 23 intersect with the facing portion 23 at an angle without being orthogonal to the facing portion 23. In other words, the fluctuation of the welding depth DP30 is adjusted so as not to be orthogonal to the facing portion 23. The fluctuation of the welding depth DP30 is adjusted so as to suppress at least the opportunity to be orthogonal to the facing portion 23. The inclined intersection relaxes the stress concentration at the facing portion 23. As a result, generation of cracks and growth of cracks from the facing portion 23 to the weld mark 30 are suppressed.

Figure 7:
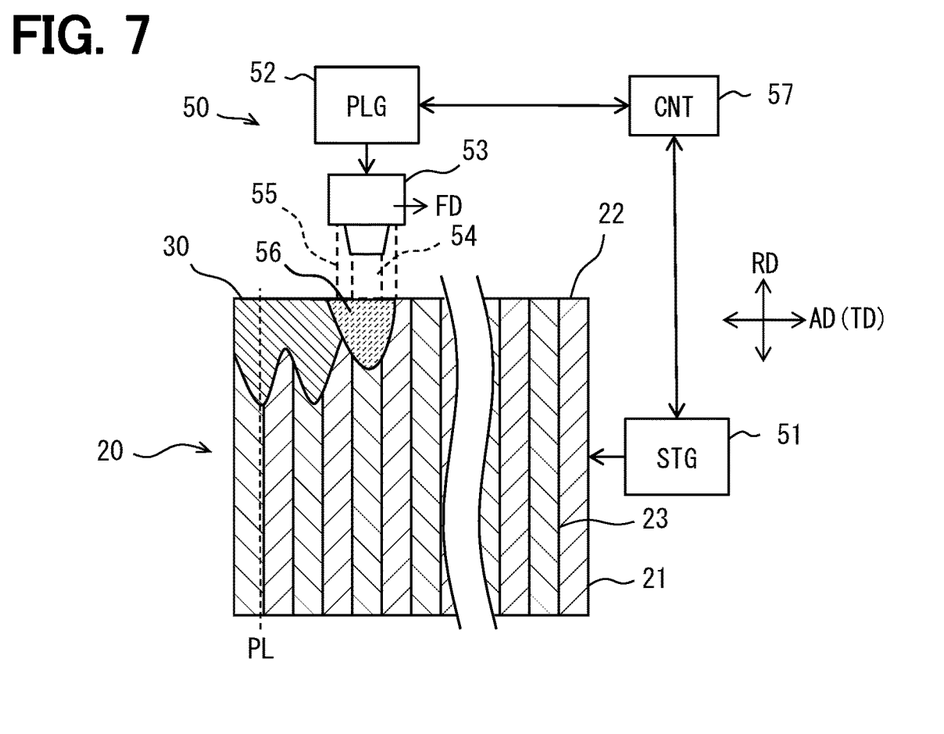
FIG. 7 is a cross-sectional view showing a manufacturing device.

FIG. 7 shows a manufacturing apparatus for manufacturing a laminated core. The manufacturing apparatus includes a welding stage 51 (STG) for installing the laminated core 20 as an object. The welding stage 51 fixes the laminated core 20. As will be described later, the welding stage 51 may move the laminated core 20. The laminated core 20 is held at the welding stage 51 so that the end surface 22 faces the welding apparatus 50. The welding apparatus 50 is a pulse type laser welding apparatus. The welding apparatus 50 includes a pulse type laser oscillator 52. The welding apparatus 50 has a nozzle 53 that is positioned to face the end surface 22. The nozzle 53 irradiates a laser beam 54 and supplies a shield gas 55. The laser beam 54 forms the laser spot 42 in FIG. 5 at a welding position on the end surface 22. The welding energy applied to the laser spot 42 melts the steel plate 21 and forms a molten pool 56. The laser beam 54 is irradiated in a pulse shape. In the drawing, an arbitrary welding position PL is illustrated.

The welding apparatus 50 has a control device (CNT) 57. The control device 57 controls the laser oscillator 52. Further, the control device 57 controls the nozzle 53 and the welding stage 51. The control device 57 moves the welding position over the plurality of steel plates 21 on the end surface 22 by relatively moving the nozzle 53 and the laminated core 20. As a result, the nozzle 53 moves in the movement direction FD, for example.

The control device 3 and 57 in this specification may be referred to as an electronic control unit (ECU: Electronic Control Unit). The control device or the control system is provided by (a) an algorithm as a plurality of logic called an if-then-else form, or (b) a learned model tuned by machine learning, e.g., an algorithm as a neural network. The control device is provided by a control system including at least one computer. The control system may include a plurality of computers linked by data communication devices. The computer includes at least one processor (hardware processor) that is hardware. The hardware processor can be provided by the following (i), (ii), or (iii).

(i) The hardware processor may be at least one processor core that executes a program stored in at least one memory. In this case, the computer is provided by at least one memory and at least one processor core. The processor core is called a CPU: Central Processing Unit, a GPU: Graphics Processing Unit, a RISC-CPU, or the like. The memory is also called a storage medium. The memory is a non-transitory and tangible storage medium, which non-temporarily stores a program and/or data readable by the processor. The storage medium may be a semiconductor memory, a magnetic disk, an optical disk, or the like. The program may be distributed as a single unit or as a storage medium in which the program is stored.

(ii) The hardware processor may be a hardware logic circuit. In this case, the computer is provided by a digital circuit including a number of programmed logic units (gate circuits). The digital circuit is also called a logic circuit array, for example, ASIC: Application-Specific Integrated Circuit, FPGA:

Field Programmable Gate Array, SoC: System on a Chip, PGA: Programmable Gate Array, or CPLD: Complex Programmable Logic Device. The digital circuit may comprise a memory storing programs and/or data. The computer may be provided by an analog circuit. A computer may be provided by a combination of a digital circuit and an analog circuit.

(iii) The hardware processor may be a combination of the above (i) and the above (ii). (i) and (ii) are placed on different chips or on a common chip. In these cases, the part (ii) is also called an accelerator.

The control device, the signal source, and the control object provide various elements. At least some of these elements can be referred to as blocks, modules, or sections. Furthermore, elements included in the control system are referred to as functional means only when intentional.

A control units and methods described in the present disclosure may be implemented by a special purpose computer which is configured with a memory and a processor programmed to execute one or more particular functions embodied in computer programs of the memory. Alternatively, the control unit described in the present disclosure and the method thereof may be realized by a dedicated computer configured as a processor with one or more dedicated hardware logic circuits. Alternatively, the control unit and the method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

Figure 8:
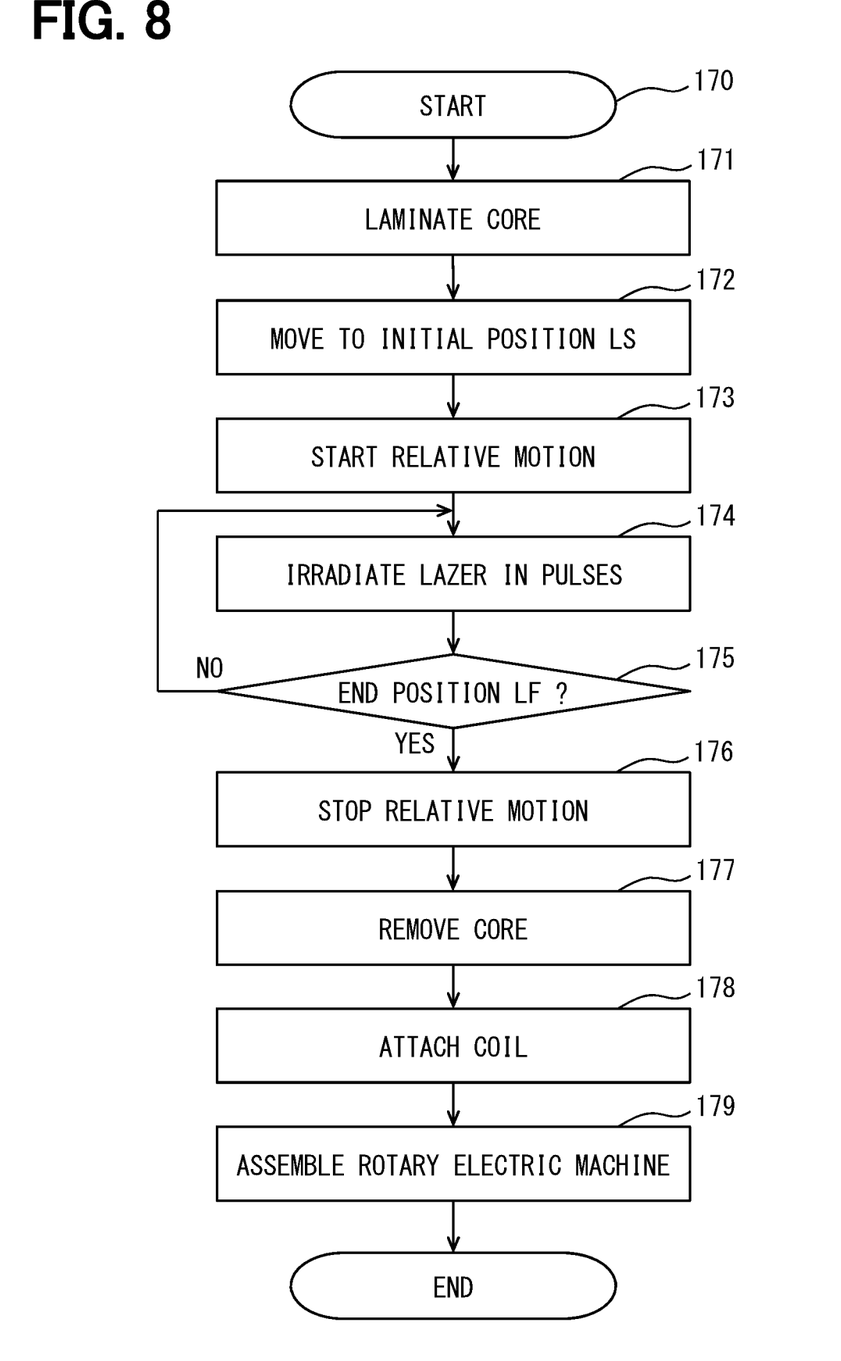
FIG. 8 is a flowchart showing a manufacturing method.

In FIG. 8, the manufacturing method of a rotary electric machine includes a manufacturing method of a laminated core. In the following description, a method for manufacturing a rotary electric machine will be described, and a method for manufacturing the laminated core 20 will be described in detail. The terms "process", "stage", and "step" are interchangeable. The rotary electric machine manufacturing method 170 includes a preparation step of preparing a plurality of elements for the rotary electric machine 1. In the preparation step, the rotor 4, the stator 10, and the housing 6 are prepared. The following steps 171-178 show the process of preparing the stator 10. In this, the manufacturing method of the stator core 11 as the laminated core 20 is contained.

In a step 171, a laminated body is formed by laminating a plurality of steel plates 21 in the thickness direction TD. The step 171 provides a laminating process. In a step 172, the laminated core 20 is positioned on the welding stage 51. In the step 172, the laminated core 20 and the nozzle 53 are positioned at the initial position LS for starting laser welding. In the step 172, the laser beam 54 supplied by the nozzle 53 is positioned at the initial position LS of the welding position of the end face 22. In a step 173, relative movement is started by moving the welding stage 51 and the nozzle 53 relatively. The relative movement continues until a step 176. The process in the steps 173 to 176 provides a moving process for moving the welding position over the plurality of steel plates 21 on the end surface 22.

In a step 174, the laser oscillator 52 provides a laser pulse for welding. The laser oscillator 52 generates a plurality of pulses of welding energy. This laser is for a laser welding and has welding energy. The step 174 provides a laser oscillation process. At the same time, in the step 174, the end surface 22 is irradiated with laser. The welding apparatus 50 applies welding energy to the welding position of the end surface 22 where the plurality of steel plates 21 are exposed. At the same time, the welding apparatus 50 provides a welding process for forming the welding mark 30 having a welding depth corresponding to the welding energy.

Figure 9:
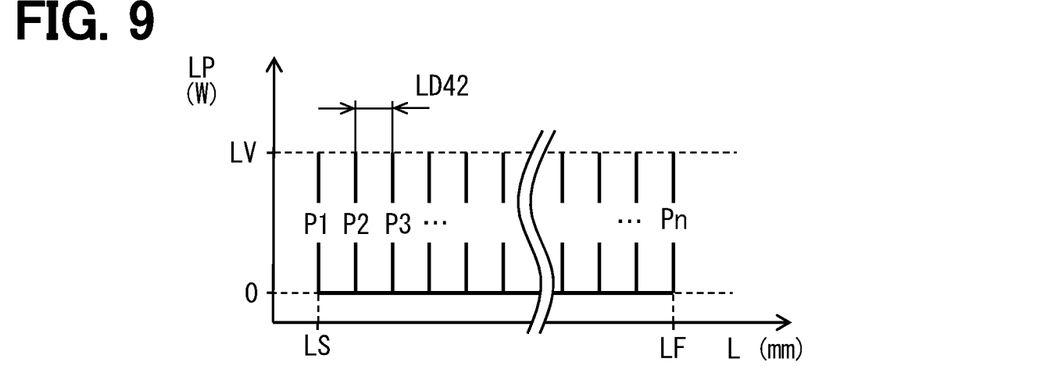
FIG. 9 is a waveform diagram showing a relationship between a plurality of pulses and distance.

FIG. 9 shows a waveform of the laser output LP(W). The horizontal axis is the distance L (mm). The laser is supplied as a plurality of pulses P1, P2, P3 . . . Pn. The interval between the plurality of pulses is a distance LD42. The laser output LV supplies welding energy.

Figure 10:
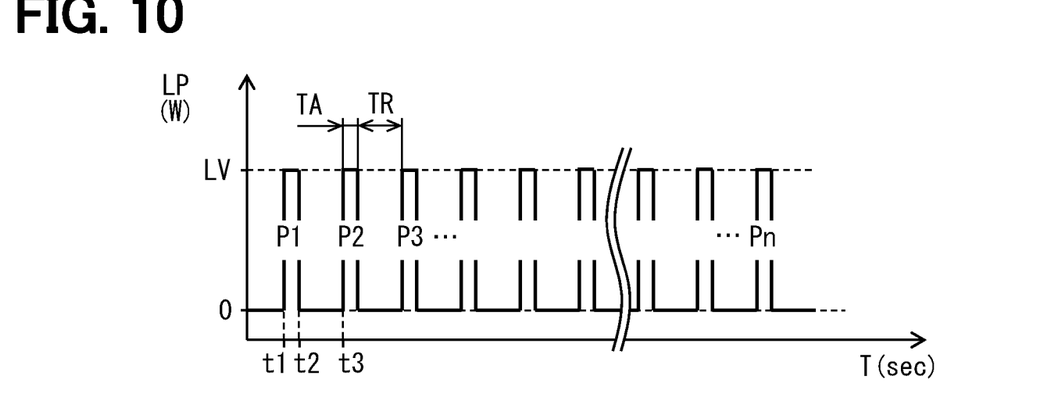
FIG. 10 is a waveform diagram showing a relationship between a plurality of pulses and time.

FIG. 10 shows a waveform of a laser output LP(W). The horizontal axis represents time T (sec). The laser pulse P1 starts at time t1 and stops at time t2. The next laser pulse P2 starts at time t2. The pulse width TA, which is the supply period of the laser pulse, and the pause period TR between pulses define a duty ratio. The duty ratio defines the shape of the welding mark 30 and the shape of the welding depth DP30 under the relationship with the relative moving speed of the welding position provided by the moving process.

Figure 11:
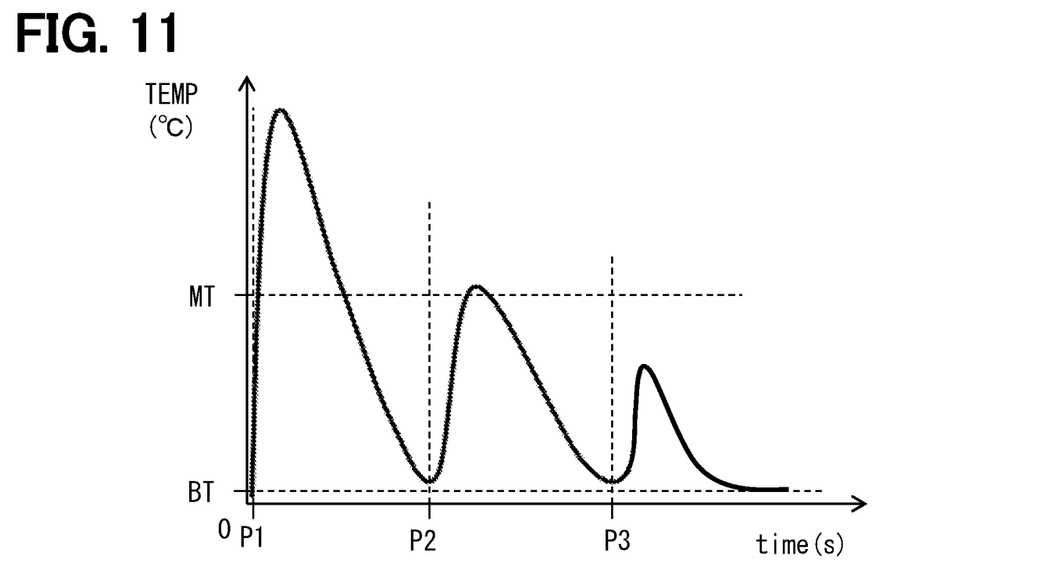
FIG. 11 is a waveform diagram showing a temperature change at one spot.

FIG. 11 shows a waveform of a temperature change at an arbitrary welding position PL on the end surface 22. The drawing shows a case where welding is started from the welding position PL. Due to the first laser pulse P1, the temperature of the welding position PL increases rapidly. The temperature exceeds the melting temperature MT. Thereby, a molten pool is formed in the welding position PL. When the laser irradiation ends, the temperature decreases rapidly. Thereby, the metal of the molten pool solidifies and welding is performed. Before the temperature of the welding position PL returns to a normal temperature range BT, the second laser pulse P2 is further irradiated. Due to the second pulse P2, the temperature of the welding position PL rises again. The temperature at the welding position PL may exceed the melting temperature MT. Due to the second pulse P2, the temperature of the welding position PL may not exceed the melting temperature MT. When a plurality of laser spots 42 overlap by about 60(%), the center of the first laser spot 42 exceeds the melting temperature MT again by the pulse P2. In either case, the temperature rises in the entire welding mark 30 centering on the welding position PL. Furthermore, due to the third pulse P3, the temperature of the welding position PL does not exceed the melting temperature MT but increases. As described above, the temperature of the welding position PL repeatedly increases after the first pulse P1 for welding the position is irradiated. Moreover, the temperature at the welding position PL is heated to a temperature exceeding the melting temperature MT, cooled, and then heated again to the vicinity of the melting temperature MT. As a result, the welding mark 30 is annealed whenever the temperature rises.

Figure 12:
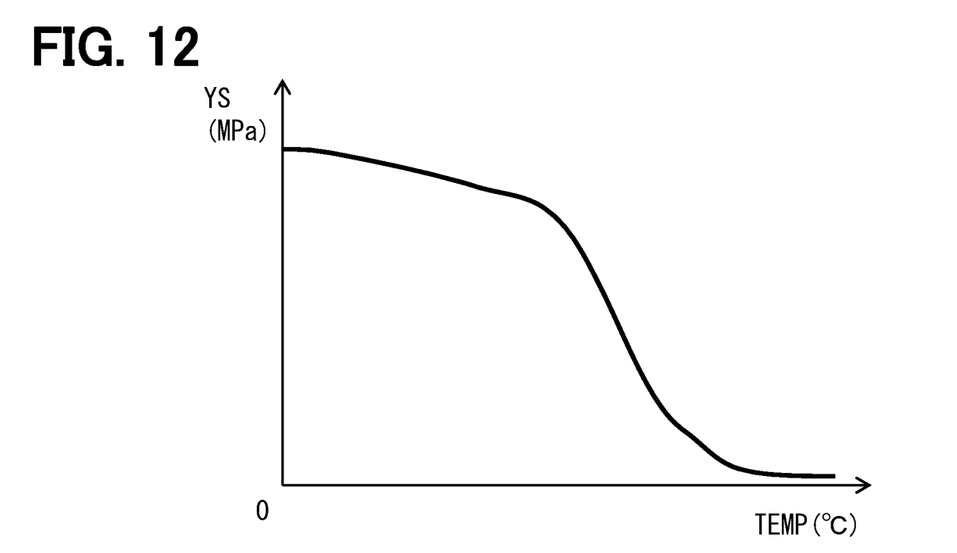
FIG. 12 is a waveform diagram showing the relationship between yield stress and temperature.

FIG. 12 shows the temperature characteristic of the yield stress YS (MPa) of the material of the steel plate 21. The yield stress YS is lower at higher temperatures. Annealing results in a decrease in yield stress. Also, the annealing reduces the residual stress accompanying melting and solidification by the first pulse P1. As a result, the temperature increase provided by the subsequent pulse reduces the stress at the weld location due to the preceding pulse.

The welding energy provided by the laser produces a relatively deep weld penetration shape. As a result, a deep weld penetration shape over a plurality of steel plates 21 is obtained. Furthermore, the welding mark 30 according to the weld penetration shape is obtained. Specifically, a deep weld molten pool forms the welding mark 30 with fluctuating welding depths.

Returning to FIG. 8, in a step 175, the control device 57 determines whether or not the welding position has reached the end position LF. The control device 57 may include a sensor that measures the movement amount of the welding stage 51 or the movement amount of the nozzle 53. If it is determined in the step 175 that the welding position is not the end position LF (NO), the process of the step 174 is repeated. If it is determined in the step 175 that the welding position has exceeded the end position LF (YES), the process proceeds to a step 176.

By repeating the step 174 and the step 175, irradiation with one laser pulse and relative movement of the distance LD42 are provided. The welding process and the moving process are executed so as to form a line shaped welding mark 30 on the end face 22 by a plurality of pulses. The line shaped welding mark 30 has a welding depth DP30 that fluctuates with a wavelength LD42 longer than the thickness TH21 of the steel plate 21. The welding process and the moving process form a fluctuation in the welding depth DP30 that is inclined at the facing portion 23. The fluctuation of the welding depth DP30 in the facing portion 23 suppresses stress concentration in the facing portion 23. The fluctuation of the welding depth DP30 in the facing portion 23 disperses the stress in the plurality of facing portions 23.

Further, the welding process and the moving process form a continuous portion 34 and a fluctuating portion 35 in the depth direction by a plurality of pulses. The continuous portion 34 extends without fluctuation of the welding depth DP34 over the plurality of steel plates 21. The fluctuating portion 35 has a depth DP35, in which the depth DP35 fluctuates periodically over the plurality of steel plates 21, and is substantially equal to the depth DP34 in the continuous portion 34.

In the step 176, the relative movement is stopped. In a step 177, the laminated core 20 is taken out from the welding stage 51. In a step 178, the laminated core 20 is used as the rotor core 7 or the stator core 11. When the laminated core 20 is the rotor core 7, a rotor coil or a magnet is attached. When the laminated core 20 is the stator core 11, the stator coil 12 is mounted. In a step 179, the stator 10 and the rotor 4 are mounted on the housing 6, and the rotary electric machine 1 is assembled. Thus, the rotary electric machine 1 is manufactured.

In the above embodiment, the output of the laser can be 1000 (W) or more and 3000 (W) or less. The diameter of the laser spot 42 may be 0.6 (mm) or more and 3.5 (mm) or less. The generation frequency of the laser pulse may be 6 (Hz) or more and 60 (Hz) or less. The relative feed rate of the welding position may be 5 (mm/sec) or more and 30 (mm/sec) or less. The output of the laser is, for example, 1500 (W). The pulse width TA of the laser may be set to 10 (msec), for example. The thickness TH21 of the steel plate 21 may be set to 0.25 (mm), for example. The distance LD42 of the plurality of laser pulses may be set to 0.6 (mm), for example. The diameter of the laser spot 42 may be 1.5 (mm). The duty of the laser pulse may be 50% or less, for example, is 36%.

According to the embodiment described above, the line shaped welding marks 30 connect the plurality of steel plates 21 in the laminated core. The welding mark 30 has a welding depth DP30 of which depth fluctuates. Moreover, the welding depth DP30 fluctuates with the wavelength LD42 longer than the thickness TH21 of the steel plate 21. The fluctuating welding depth relieves stress concentration and suppresses occurrence of cracks and growth of cracks at the facing portion 23 between the steel plate 21 and the steel plate 21. As a result, a laminated core in which a plurality of steel plates are stably connected is provided. The laminated core is suitable for use as a rotor core or a stator core of a rotary electric machine. Furthermore, according to the manufacturing method of a laminated core, the manufacturing method of the laminated core in which a plurality of steel plates are connected stably is provided.

Second Embodiment

This embodiment is a modification based on the preceding embodiment. In the above embodiment, the welding mark 32 has several partial welding tracks 32a, 32b, and 32c. Alternatively, the welding mark 30 may be formed so as to draw various lines.

Figure 13:
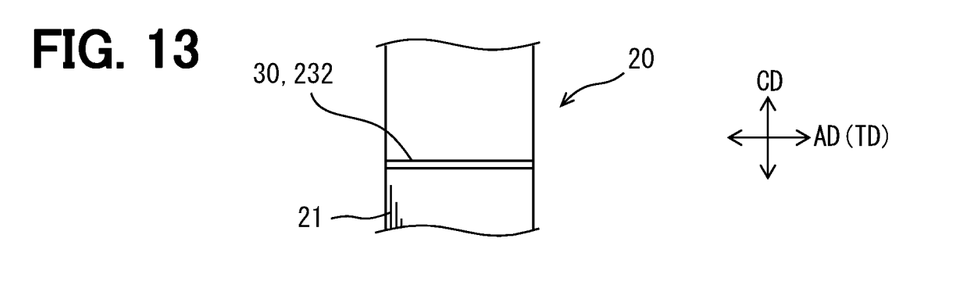
FIG. 13 is a side view showing a stator core according to a second embodiment.

In FIG. 13, the welding mark 30 may be provided by a welding mark 232. The welding mark 232 extends continuously over the entire region of the stator core 11 as the laminated core 20. The welding mark 232 extends in a straight line shape along the thickness direction TD. The welding mark 232 extends in a straight line shape in parallel with the axial direction AD. The welding mark 232 extends continuously from one end to the other end along the thickness direction TD of the plurality of steel plates 21.

Third Embodiment

Figure 14:
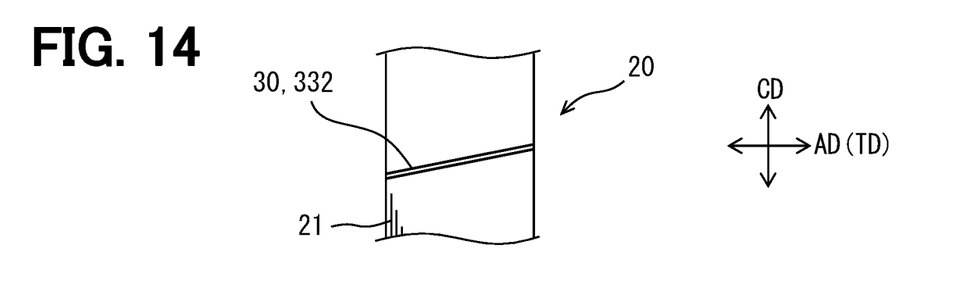
FIG. 14 is a side view showing a stator core according to a third embodiment.

This embodiment is a modification based on the preceding embodiment. In FIG. 14, the welding mark 30 may be provided by a welding mark 332. The welding mark 332 extends continuously over the entire region of the stator core 11 as the laminated core 20. The welding mark 332 extends in a straight line shape. The welding mark 332 is inclined with respect to the thickness direction TD of the plurality of steel plates 21.

Fourth Embodiment

Figure 15:
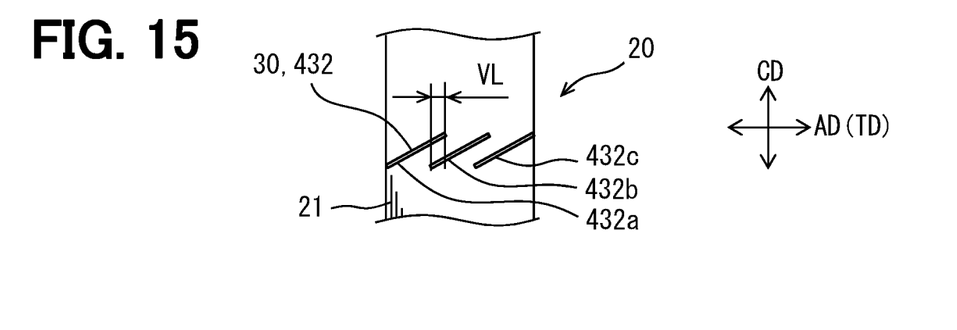
FIG. 15 is a side view showing a stator core according to a fourth embodiment.

This embodiment is a modification based on the preceding embodiment. In FIG. 15, the welding mark 30 may be provided by a welding mark 432. The welding mark 432 includes a plurality of partial welding marks 432a, 432b, and 432c. Two partial weld marks 432 adjacent to the thickness direction TD overlap with each other with respect to the thickness direction TD and the circumferential direction CD. In the drawing, the partial welding mark 432a overlaps with the partial welding mark 432b. In the drawing, the partial welding mark 432b overlaps with the partial welding mark 432c. Two partial welding marks 432 adjacent to each other in the thickness direction TD overlap with each other over the overlapping range VL with respect to the circumferential direction CD. Two partial weld marks 432 adjacent in the thickness direction TD overlap in the entire region in the thickness direction TD. As a result, the plurality of partial weld marks 432a, 432b, and 432c substantially extend over the entire region of the stator core 11 as a laminated core. Each of the plurality of partial welding marks 432a, 432b, 432c extends in a straight line shape. Each of the plurality of partial weld marks 432a, 432b, 432c is inclined with respect to the thickness direction TD of the plurality of steel plates 21.

Other Embodiments

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional portions which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

In the above embodiment, the welding mark 30 extends in a straight line shape. Alternatively, the welding mark 30 may extend in a curved shape. Further, the welding mark 30 may extend along a vibrational track line. For example, the welding mark 30 may extend along a triangular wave, a sine wave, or a rectangular wave.

In the above embodiments, a pulse type laser welding apparatus is employed as the welding apparatus 50. Alternatively, a pulse-type electron beam welding apparatus may be employed.

In the above embodiment, the laminated core 20 provides the rotor core 7 or the stator core 11 of the rotary electric machine 1. Alternatively, the laminated core 20 may provide a static electric machine core. The laminated core 20 can be used as a core of a transformer, for example.

What is claimed is:

1. A laminated core comprising:
   a plurality of steel plates laminated in a thickness direction; and
   a line-shaped welding mark connecting the plurality of steel plates, the line-shaped welding mark extending over the plurality of steel plates at an end surface of the plurality of steel plates where the plurality of steel plates are exposed, and the line-shaped welding mark including a welding depth in a depth direction perpendicular to the thickness direction that fluctuates along a length direction of the line-shaped welding mark so that a line of intersection between the line-shaped welding mark and the plurality of steel plates is wavy and has a wavelength along the length direction that is longer than a thickness of one of the plurality of steel plates, wherein:
   a width of the line-shaped welding mark is greater than the thickness of one of the plurality of steel plates at the end surface;
   the line-shaped welding mark with respect to the depth direction includes a continuous portion extending without fluctuation in depth over the plurality of steel plates and a fluctuating portion whose depth fluctuates periodically over the plurality of steel plates; and
   a depth of the continuous portion and a maximum depth of the fluctuating portion are substantially equal.

2. The laminated core claimed in claim 1, wherein
   the width of the line-shaped welding mark at the end surface of the plurality of steel plates fluctuates, and
   a one-sided fluctuation width of the line-shaped welding mark is smaller than the thickness of one of the plurality of steel plates.

3. The laminated core claimed in claim 1, wherein
   the line-shaped welding mark is inclined with respect to the thickness direction.

4. The laminated core claimed in claim 1, comprising
   a plurality of welding marks, one of which is the line-shaped welding mark.

5. The laminated core claimed in claim 4, wherein the plurality of welding marks are arranged at equal intervals.

6. A rotary electric machine comprising:
a rotor core or a stator core, which is a laminated core comprising:
  a plurality of steel plates laminated in a thickness direction; and
  a line-shaped welding mark connecting the plurality of steel plates, the line-shaped welding mark extending over the plurality of steel plates at an end surface of the plurality of steel plates where the plurality of steel plates are exposed, and the line-shaped welding mark including a welding depth in a depth direction perpendicular to the thickness direction that fluctuates along a length direction of the line-shaped welding mark so that a line of intersection between the line-shaped welding mark and the plurality of steel plates is wavy and has a wavelength along the length direction that is longer than a thickness of one of the plurality of steel plates, wherein:
a width of the line-shaped welding mark is greater than the thickness of one of the plurality of steel plates at the end surface;
the line-shaped welding mark with respect to the depth direction includes a continuous portion extending without fluctuation in depth over the plurality of steel plates and a fluctuating portion whose depth fluctuates periodically over the plurality of steel plates;
a depth of the continuous portion and a maximum depth of the fluctuating portion are substantially equal; and
the welding depth of the line-shaped welding mark fluctuates along an axial direction of the rotor core or the stator core.

7. The laminated core claimed in claim 1, wherein the laminated core is one of a plurality of laminated cores arranged in a laminated manner.

8. A method for manufacturing a laminated core, the method comprising:
laminating a plurality of steel plates in a thickness direction;
generating pulses of welding energy by a welding device;
welding by applying the welding energy to a welding position of an end surface where the plurality of steel plates are exposed, thereby forming a line-shaped welding mark having a welding depth in a depth direction perpendicular to the thickness direction according to the welding energy; and
moving the welding position across the plurality of steel plates on the end surface, wherein
the welding and the moving form the line-shaped welding mark by a plurality of the pulses on the end surface, the line-shaped welding mark connecting the plurality of steel plates, the line-shaped welding mark extending over the plurality of steel plates at the end surface, and the line-shaped welding mark including the welding depth that fluctuates along a length direction of the line-shaped welding mark so that a line of intersection between the line-shaped welding mark and the plurality of steel plates is wavy and has a wavelength along the length direction that is longer than a thickness of one of the plurality of steel plates, and
the welding and the moving form the line-shaped welding mark so that
  a width of the formed line-shaped welding mark is greater than the thickness of one of the plurality of steel plates at the end surface;
  the formed line-shaped welding mark with respect to the depth direction includes a continuous portion extending without fluctuation in depth over the plurality of steel plates and a fluctuating portion whose depth fluctuates periodically over the plurality of steel plates; and
  a depth of the continuous portion and a maximum depth of the fluctuating portion are substantially equal.

* * * * *